(12) United States Patent
Tsuchiya

(10) Patent No.: US 11,299,243 B2
(45) Date of Patent: Apr. 12, 2022

(54) PNEUMATIC FENDER AND MANUFACTURING METHOD THEREFOR

(71) Applicant: THE YOKOHAMA RUBBER CO., LTD., Tokyo (JP)

(72) Inventor: Kouko Tsuchiya, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 17/419,907

(22) PCT Filed: Nov. 12, 2019

(86) PCT No.: PCT/JP2019/044349
§ 371 (c)(1),
(2) Date: Jun. 30, 2021

(87) PCT Pub. No.: WO2020/148983
PCT Pub. Date: Jul. 23, 2020

(65) Prior Publication Data
US 2022/0041257 A1    Feb. 10, 2022

(30) Foreign Application Priority Data

Jan. 16, 2019   (JP) .............................. JP2019-004907

(51) Int. Cl.
*B63B 59/02*   (2006.01)
*E02B 3/26*   (2006.01)

(52) U.S. Cl.
CPC ................ *B63B 59/02* (2013.01); *E02B 3/26* (2013.01); *B63B 2059/025* (2013.01)

(58) Field of Classification Search
CPC ... B63B 59/00; B63B 59/02; B63B 2059/025; E02B 3/20; E02B 3/26; E02B 3/28; F16M 1/00; B60C 3/02
(Continued)

(56) References Cited

U.S. PATENT DOCUMENTS 3,063,400 A * 11/1962 Yamaguchi ............... E02B 3/26
114/219
4,296,705 A * 10/1981 Uruta ......................... E02B 3/26
114/219
(Continued)

FOREIGN PATENT DOCUMENTS

JP    H06-33433 A    2/1994
JP    2006-291628 A    10/2006
(Continued)

*Primary Examiner* — Lars A Olson
(74) *Attorney, Agent, or Firm* — Carrier Blackman & Associates, P.C.; Joseph P. Carrier

(57) ABSTRACT

A cord angle of reinforcing layers having a bias structure constituting a body portion is set to 25° or more and 45° or less in a neutral state of a body. Reinforcing layers are bonded with a bonding member interposed between the reinforcing layers, the bonding member disposed in a space between the reinforcing layers facing in the cylinder axial direction of the body portion and a hemispherical portion. The layered bonding members have the same bias structure as the reinforcing layers of the body portion. A cord angle of the bonding member is set to ±10° of the cord angle of the reinforcing layers of the body portion. The spaces have a plurality of different sizes. One set of ends of the spaces are set to a plurality of different positions, and the other set of ends are also set to a plurality of different positions.

5 Claims, 10 Drawing Sheets

(58) Field of Classification Search
USPC .......................................................... 114/219
See application file for complete search history.

(56) References Cited

U.S. PATENT DOCUMENTS

| | | |
|---|---|---|
| 9,365,992 B2 | 6/2016 | Yamada et al. |
| 9,499,243 B2 | 11/2016 | Sakakibara et al. |
| 2015/0114274 A1 | 4/2015 | DeBruijn |

FOREIGN PATENT DOCUMENTS

| | | |
|---|---|---|
| JP | 2013-231297 A | 11/2013 |
| JP | 2014-218866 A | 11/2014 |
| KR | 2012-0058171 A | 6/2012 |
| KR | 10-1356563 B1 | 1/2014 |
| KR | 2015-0080030 A | 7/2015 |
| WO | 2013/161874 A1 | 10/2013 |

* cited by examiner

PNEUMATIC FENDER AND MANUFACTURING METHOD THEREFOR

TECHNICAL FIELD

The present invention relates to a pneumatic fender and a method of manufacturing the same, and particularly, relates to a pneumatic fender and a method of manufacturing the same in which the boundary region between a body portion and a hemispherical portion is expanded smoothly together with the expanding body portion when a body is loaded with a specified internal pressure to make it easier to ensure the body with a predetermined shape.

BACKGROUND ART

Pneumatic fenders typically include a body provided with a hemispherical portion having a bowl shape at both ends of a body portion having a cylindrical shape, and the body is constituted by a plurality of reinforcing layers layered between an inner layer rubber and an outer layer rubber. In the body portion, each of the reinforcing layers is formed of multiple cords aligned in parallel, and the cords are disposed at a predetermined cord angle with respect to the cylinder axial direction. The cords of the reinforcing layers layered adjacently are in an intersecting state (so-called bias structure). When the cord angle in the neutral state where the body is not expanded is set to approximately the angle of repose (from 54° to 55°), the size (length and outer diameter) of the body does not change so much even when the inside of the body is filled with air and loaded with a specified internal pressure.

A pneumatic fender in which a cord angle of the reinforcing layers of a body portion is set to 15° or more and 45° or less in a neutral state where a body is not expanded has been proposed (see Patent Document 1). In the fender of this proposal, when the inside of the body is filled with air and loaded with a specified internal pressure, the cord angle of the reinforcing layer of the body portion will increase to approximately the angle of repose. Accordingly, since the body portion is expanded greatly in diameter, excellent cushioning performance (counter force) can be obtained when used while being compact when not in use.

However, unlike the reinforcing layer of the body portion, the cord angle of the reinforcing layer of the hemispherical portion in a neutral state in which the body is not expanded is not set to 15° or more and 45° or less. Thus, even when the body is loaded with the specified internal pressure, the boundary region between the hemispherical portion and the body portion does not expand greatly in diameter smoothly. As a result, since strain occurs at or near the boundary between the hemispherical portion and the body portion, a body that has been expanded to a predetermined shape cannot be ensured.

CITATION LIST

Patent Literature

Patent Document 1: JP 2013-231297 A

SUMMARY OF INVENTION

Technical Problem

An object of the present invention is to provide a pneumatic fender and a method of manufacturing the same in which the boundary region between a body portion and a hemispherical portion is expanded smoothly together with the expanding body portion when the body is loaded with a specified internal pressure to make it easier to ensure the body with a predetermined shape.

Solution to Problem

To achieve the object described above, the pneumatic fender according to embodiments of the present invention is a pneumatic fender which includes a body including a body portion having a cylindrical shape, and a hemispherical portion having a bowl shape connected to both ends of the body portion, in which the body is constituted by a plurality of reinforcing layers layered between an inner layer rubber and an outer layer rubber, each of the reinforcing layers in the body portion is formed of multiple cords aligned to extend in parallel at a predetermined cord angle with respect to a cylinder axial direction, the cords of the reinforcing layers layered adjacently have an intersecting bias structure, and the cord angle in a neutral state where the body is not expanded is set to 25° or more and 45° or less, both end portions in the cylinder axial direction of each of the reinforcing layers of the body portion and each of the corresponding reinforcing layers of the hemispherical portion facing each other with a space, members facing each other being bonded with a bonding member interposed between the members facing each other, the bonding member disposed in each of the spaces, each of the bonding members being formed of multiple cords aligned to extend in parallel, the multiple cords of the bonding members extending in an orientation identical to an orientation of the cords of a corresponding bonding target reinforcing layer of the body portion, a cord angle of the cords of the bonding members being set to ±10° of the cord angle of the cords of the bonding target reinforcing layer in a neutral state where the body is not expanded, the spaces having a plurality of different sizes, one set of ends of the spaces being set to a plurality of different positions, and an other set of ends of the spaces being set to a plurality of different positions, with respect to a circumferential direction of the hemispherical portion having an arcuate shape in a side view of the body.

The method of manufacturing the pneumatic fender according to embodiments of the present invention is a method of manufacturing the pneumatic fender described above, the method including: using a molding mold for the body portion having a cylindrical shape and a molding mold for the hemispherical portion having a bowl shape connected to both ends of the molding mold for the body portion to create a state in which the molding mold for the body portion and the molding molds for the hemispherical portion are separated; layering the reinforcing layers constituting the body portion on an inner side of the molding mold for the body portion; layering the reinforcing layers constituting the hemispherical portion on an inner side of each of the molding molds for the hemispherical portion; connecting the molding molds for the hemispherical portion to both ends of the molding mold for the body portion so that both end portions in the cylinder axial direction of each of the reinforcing layers constituting the body portion and each of the corresponding reinforcing layers of the hemispherical portion face each other with a space; sequentially disposing the bonding members in the respective spaces to form a reinforcing body formed of the reinforcing layers; and vulcanizing a bladder in which unvulcanized rubbers that form the outer layer rubber and the inner layer rubber are layered on an outer surface and an inner surface of the reinforcing body under predetermined conditions to obtain the body.

Advantageous Effects of Invention

According to the pneumatic fender according to embodiments of the present invention, not only the reinforcing layers constituting the body portion, but also the bonding members disposed in each space between the reinforcing layers and the reinforcing layers constituting the hemispherical portion and disposed facing the reinforcing layers have a bias structure in which the cords layered adjacently intersect each other. In the neutral state where the body is not expanded, the cord angle of the reinforcing layer of the body portion is set to 25° or more and 45° or less, and the cord angle of the reinforcing layer is set to be approximately identical to the cord angle of the bonding member. Accordingly, when the body is filled with air and loaded with the specified internal pressure, since the cord angle of each of the reinforcing layer of the body portion and the bonding members will increase to approximately a stable angle of repose, the body portion and the boundary region between the body portion and the hemispherical portion will also easily expand. Furthermore, since the respective spaces have a plurality of different types of sizes, one set of ends of the spaces are set to a plurality of different positions, and the other set of ends of the spaces are also set to a plurality of different positions, with respect to the circumferential direction of the hemispherical portion having an arcuate shape in a side view of the body. Thus, since the bonding positions between the bonding members and the respective reinforcing layers are dispersed with respect to the circumferential direction, the difference in rigidity of the body in the circumferential direction is suppressed. Accordingly, when the body is loaded with the specified internal pressure, the strain occurring at or near the boundary between the body portion and the hemispherical portion is rectified, and it becomes easy to obtain the body that has been expanded to a predetermined shape.

According to the method of manufacturing the pneumatic fender according to embodiments of the present invention, after a multilayer structure of the reinforcing layers constituting the body portion and a multilayer structure of the reinforcing layers constituting the hemispherical portions are separately formed using a molding mold for the body portion having a cylindrical shape and a molding mold for the hemispherical portion having a bowl shape connected to both ends of the molding mold for the body portion, the multilayer structures are bonded by the bonding member to form a reinforcing body formed of the reinforcing layers. Accordingly, the pneumatic fender described above can be efficiently manufactured.

DESCRIPTION OF EMBODIMENTS

Figure 1:
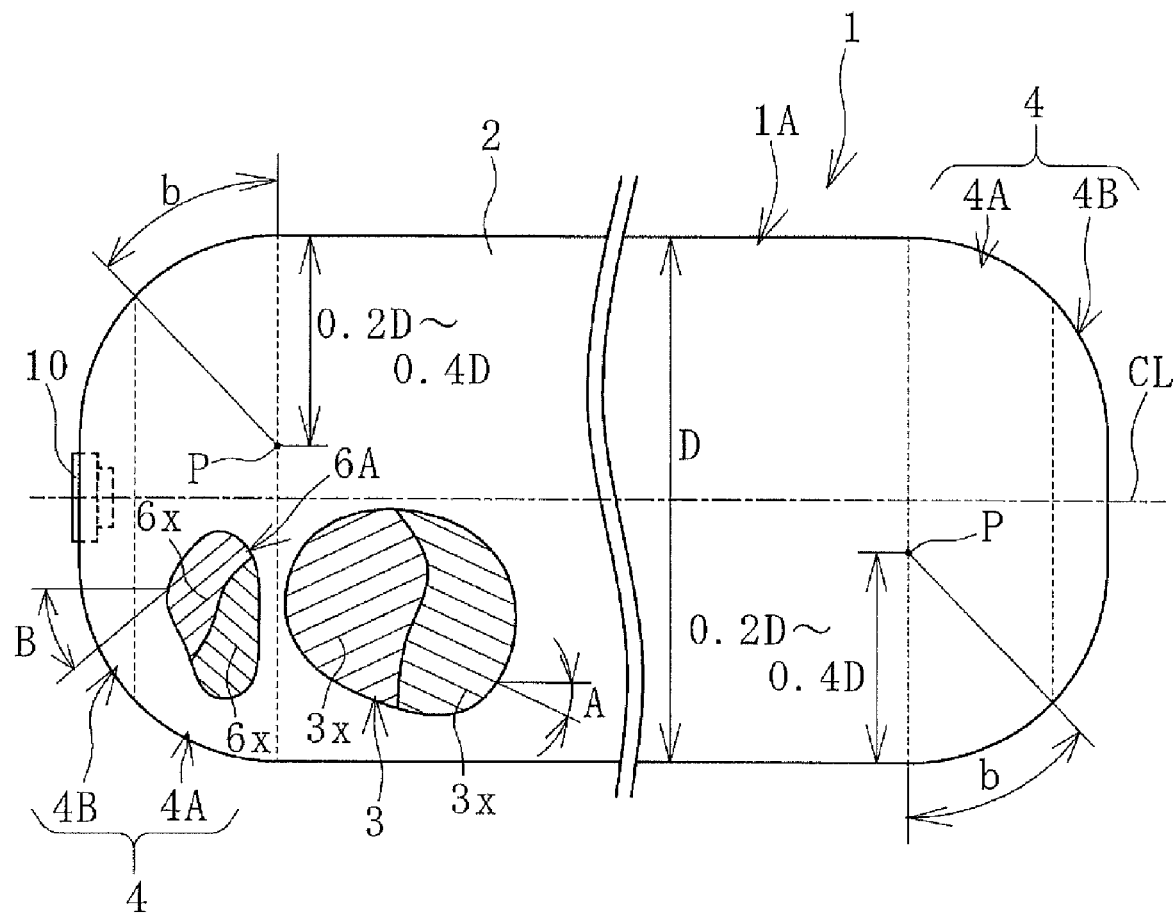
FIG. 1 is an explanatory diagram illustrating a pneumatic fender according to an embodiment of the present invention in a neutral state where a body is not expanded, with a portion of a member of the body being cut away in a side view.
Figure 2:
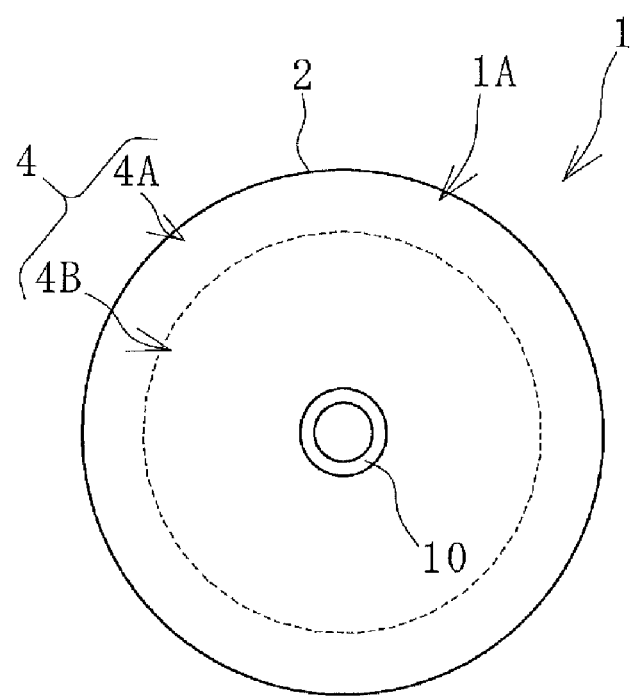
FIG. 2 is an explanatory diagram illustrating the pneumatic fender of FIG. 1 in a front view.

A pneumatic fender and a method of manufacturing the same according to embodiments of the present invention will be described below with reference to the drawings.

A pneumatic fender 1 (hereinafter referred to as a fender 1) according to embodiments of the present invention illustrated in FIGS. 1 to 5 includes a body 1A having a hemispherical portion 4 having a bowl shape connected to both ends of a body portion 2 having a cylindrical shape, and a mouthpiece portion 10 provided on the body 1A. In this embodiment, the mouthpiece portion 10 is provided on one of the hemispherical portions 4, but may be provided on both hemispherical portions 4.

Figure 3:
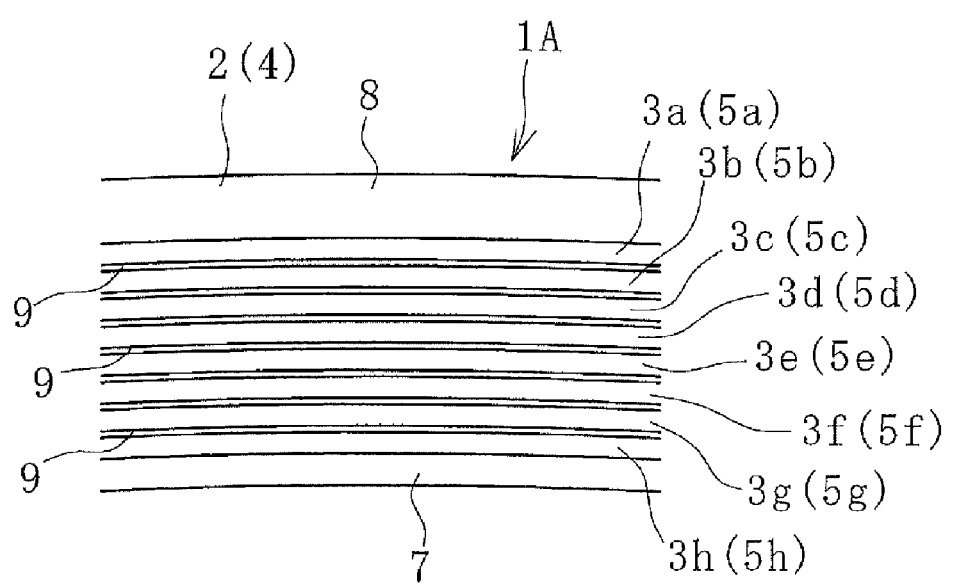
FIG. 3 is an explanatory diagram illustrating the internal structure of the body of FIG. 1 in a cross-sectional view.

As illustrated in FIG. 3, the body portion 2 is formed by layering a plurality of reinforcing layers 3 (3a to 3h) between an inner layer rubber 7 and an outer layer rubber 8. The hemispherical portion 4 is formed by layering a plurality of reinforcing layers 5 (5a to 5h) between the inner layer rubber 7 and the outer layer rubber 8. In this embodiment, the number of layers of each of the reinforcing layers 3 and 5 is 8. However, no such limitation is intended, and the number of each of the reinforcing layers 3 and 5 is, for example, approximately in a range of 6 or more and 18 or less. The number of layers of the reinforcing layers 3 is basically identical to the number of layers of the reinforcing layers 5.

Intermediate rubber layers 9 are interposed between the reinforcing layers 3 (3a to 3h) and between the reinforcing layers 5 (5a to 5h). As the rubber forming the intermediate rubber layer 9, for example, natural rubber, butyl rubber, styrene-butadiene rubber, acrylonitrile butadiene rubber and the like are used.

As the rubber forming the inner layer rubber 7, for example, natural rubber, butyl rubber, styrene-butadiene rubber, acrylonitrile butadiene rubber and the like are used. As the rubber forming the outer layer rubber 8, for example, natural rubber, styrene-butadiene rubber, acrylonitrile butadiene rubber, ethylene propylene rubber and the like are used.

Each of the reinforcing layers 3 (3a to 3h) constituting the body portion 2 is formed of multiple cords 3x that are aligned to extend in parallel to a cylinder axial direction CL at a predetermined cord angle A. Furthermore, the cords 3x of the reinforcing layers 3 layered adjacently have an intersecting bias structure. In other words, the cords 3x of the reinforcing layers 3a, 3c, 3e, and 3g extend in the direction identical to each other, and are disposed at the cord angle A. The cords 3x of the reinforcing layers 3b, 3d, 3f, and 3h extend in the direction identical to each other, and are disposed at the cord angle A, and these cords 3x are oriented intersecting the cords 3x of the reinforcing layers 3a, 3c, 3e, and 3g. In this manner, the multilayer structure of the reinforcing layers 3 has a so-called bias structure.

Figure 4:
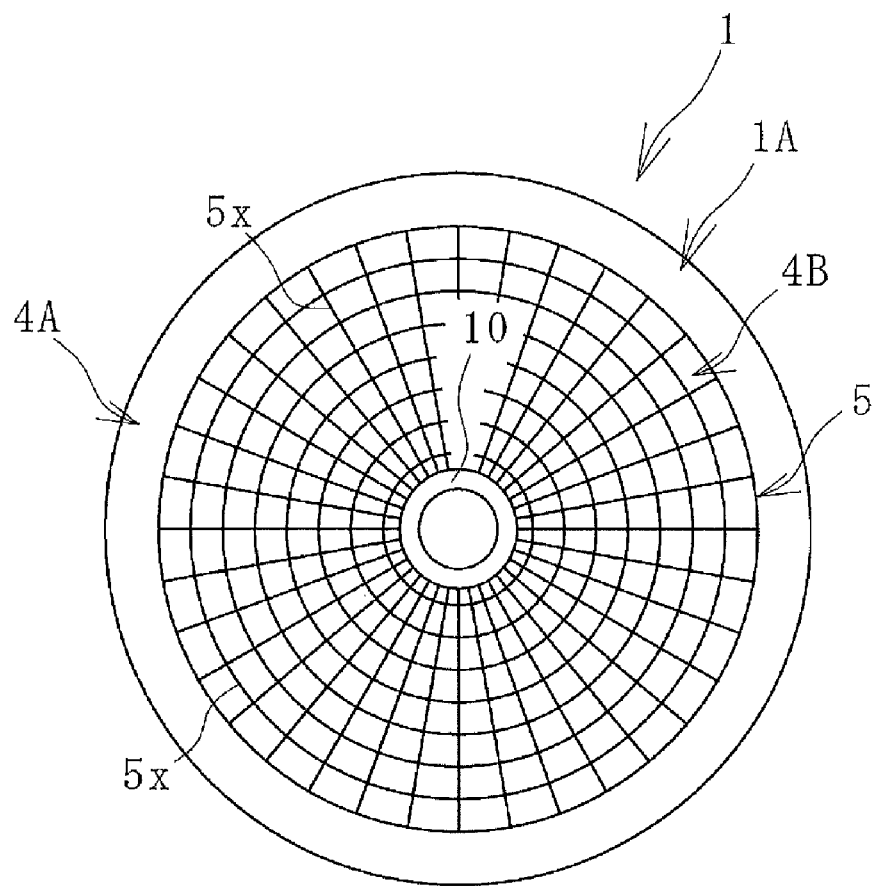
FIG. 4 is an explanatory diagram illustrating the state of a reinforcing layer in an end portion range of the hemispherical portion of FIG. 1 in a front view.

Each of the hemispherical portions 4 includes a predetermined range 4A in the cylinder axial direction CL on the boundary side with respect to the body portion 2 and an end portion range 4B other than the predetermined range 4A. As illustrated in FIG. 4, each of the reinforcing layers 5 (5a to 5h) constituting the hemispherical portion 4 is formed by alternately layering a cord layer formed of the cords 5x extending radially from the circular center of the hemispherical portion 4 and a cord layer formed of the cords 5x extending in the circumferential direction. In other words, the multilayer structure of the reinforcing layers 5 of the hemispherical portion 4 has a so-called radial structure. Note that in FIG. 1, the boundaries between the body portion 2 and the predetermined range 4A and the boundaries between the predetermined range 4A and the end portion range 4B are indicated by narrow dashed lines and are defined linearly, but in practice, each boundary is not always linearly defined.

Figure 5:
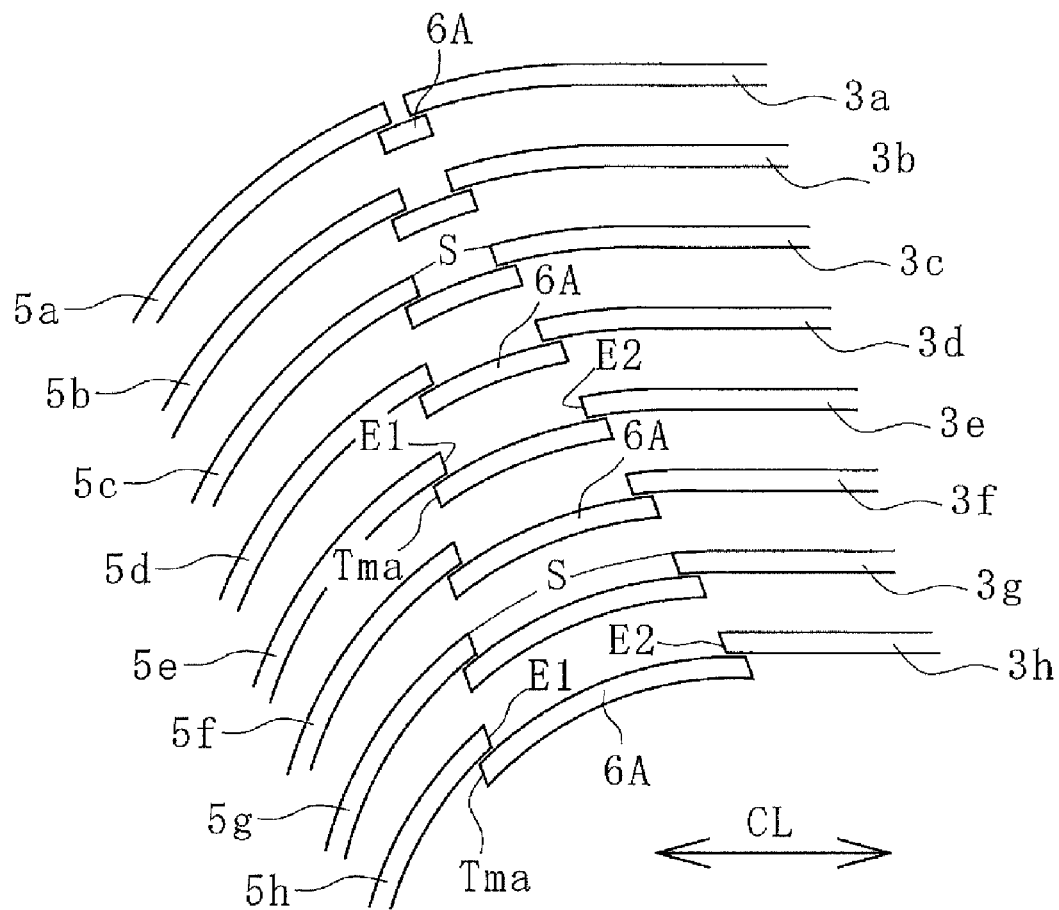
FIG. 5 is an explanatory diagram schematically illustrating a connection structure of the reinforcing layers of the body portion and the hemispherical portion of FIG. 1 in a vertical cross-sectional view.

A predetermined range 4A of the hemispherical portion 4 is a connecting portion between the body portion 2 and the hemispherical portion 4, and a bonding member 6A is disposed as illustrated in FIG. 5. In other words, the reinforcing layer 3 of the body portion 2 and the reinforcing layer 5 of the hemispherical portion 4 are bonded by the bonding member 6A. The connection structure of the reinforcing layer 3 and the reinforcing layer 5 will be described later.

Each of the bonding members 6A is formed of multiple cords 6x aligned to extend in parallel to the cylinder axial direction CL at a predetermined cord angle B. Steel cords, organic fiber cords, and the like are used as the cords 3x, 5x, and 6x. The outer diameters of the cords 3x, 5x, and 6x are, for example, approximately in a range of 0.5 mm or more and 1.5 mm or less. The cord 3x, the cord 5x, and the cord 6x basically have the specifications identical to each other, however, the respective cords may have different specifications and any one of the cords may have a different specification.

In the neutral state in which the body 1A is not expanded, the cord angle A is set to 25° or more and 45° or less. In addition, in this neutral state, the cord angle B of the bonding member 6A is set to ±10° of the cord angle A of the bonding target reinforcing layer 3, and the cords 6x and 3x thereof extend in the orientation identical to each other. In other words, the cord angle B of the bonding member 6A that is bonded to the reinforcing layer 3a is set to ±10° of the cord angle A of the reinforcing layer 3a, and the cords 6x and 3x extend in the direction identical to each other. Moreover, the cord angle B of the bonding member 6A that is bonded to the reinforcing layer 3b is set to ±10° of the cord angle A of the reinforcing layer 3b, and the cords 6x and 3x extend in the direction identical to each other.

The neutral state in which the body 1A is not expanded is a state in which tension is not substantially generated in the cords 3x, 5x, and 6x, and air is injected into the body 1A, but the internal pressure thereof is approximately slightly higher than the atmospheric pressure (for example, 10 kPa). The body portion 2 holds a cylindrical shape and the hemispherical portion 4 holds a bowl shape.

In the neutral state in which the body 1A is not expanded, the layer thickness of the inner layer rubber 7 is, for example, approximately in a range of 2 mm or more and 5 mm or less, and the layer thickness of the outer layer rubber 8 is, for example, approximately in a range of 3 mm or more and 12 mm or less. The layer thickness of the intermediate rubber layer 9 is, for example, less than 1 mm in this neutral state, and more preferably, 0.2 mm or more and 0.6 mm or less. Furthermore, the outer diameter D of the body portion 2 in this neutral state is, for example, approximately in a range of 2 m or more and 8 m or less.

Figure 6:
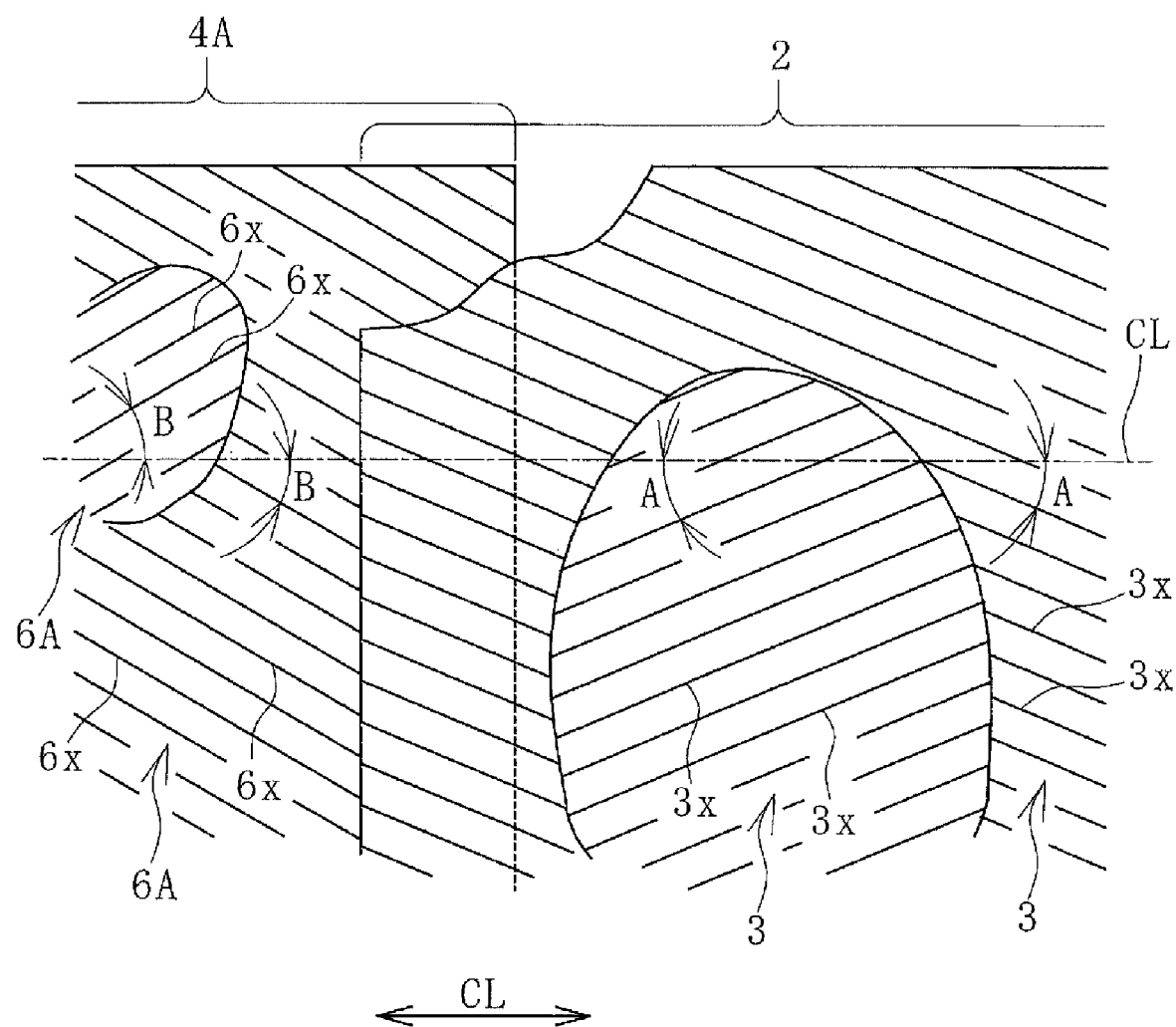
FIG. 6 is an explanatory diagram illustrating the connection structure of FIG. 5 in a plan view.

In a detailed description of the bonding structure of the bonding members 6, as illustrated in FIG. 5, both end portions in the cylinder axial direction of each of the reinforcing layers 3 of the body portion 2 and the corresponding reinforcing layers 5 of the hemispherical portions 4 face each other with a space S. In other words, the facing members such as the reinforcing layers 3a and 5a, the reinforcing layers 3b and 5b, and the reinforcing layers 3c and 5c are bonded together by the bonding members 6A disposed in the respective spaces S. The bonding length (overlap length) between each of the reinforcing layers 3 and the bonding member 6A and the bonding length (overlap length) between each of the reinforcing layers 5 and the bonding member 6A are set to the minimum necessary to prevent the rigidity from being locally increased. As illustrated in FIG. 6, the cords 6x of each of the bonding members 6A extend in the orientation identical to the orientation of the cords 3x of the corresponding bonding target reinforcing layers 3, and the cord angle B thereof is set to ±10° of the cord angle A of the cords 3x of the bonding target reinforcing layer 3 in the neutral state in which the body 1A is not expanded.

The spaces S of the facing reinforcing layers 3 and 5 have a plurality of different sizes. In FIG. 5, the size of each space S increases as it approaches the inner circumferential side of the body 1A. In other words, the space S between the reinforcing layers 3a and 5a is the smallest, and the space S between the reinforcing layers 3h and 5h is the largest. Not only the sizes of all the spaces S may be different, but also a plurality of spaces S having a size identical to each other may be present, but it is preferable that the sizes of the majority or more of the spaces S are different.

Furthermore, one set of ends E1 of the spaces S are set to a plurality of different positions, and the other set of ends E2 of the spaces S are set to a plurality of different positions, with respect to the circumferential direction of the hemispherical portion 4 having an arcuate shape in a side view of the body 1A. Different positions with respect to the circumferential direction of the hemispherical portion 4 having an arcuate shape mean that, when the arcuate shape is set as a circle having a predetermined radius, one set of ends E1 are not positioned on the identical straight line extending from the center of the circle to the arc. For example, if one set of two ends E1 are located on a single straight line extending from the center of the circle to the arc, the one set of two ends E1 will be set to the position identical to each other with respect to the circumferential direction of the hemispherical portion 4 having an arcuate shape. This is the same for the other set of ends E2.

An example of a procedure of manufacturing the fender 1 is as follows.

Figure 7:
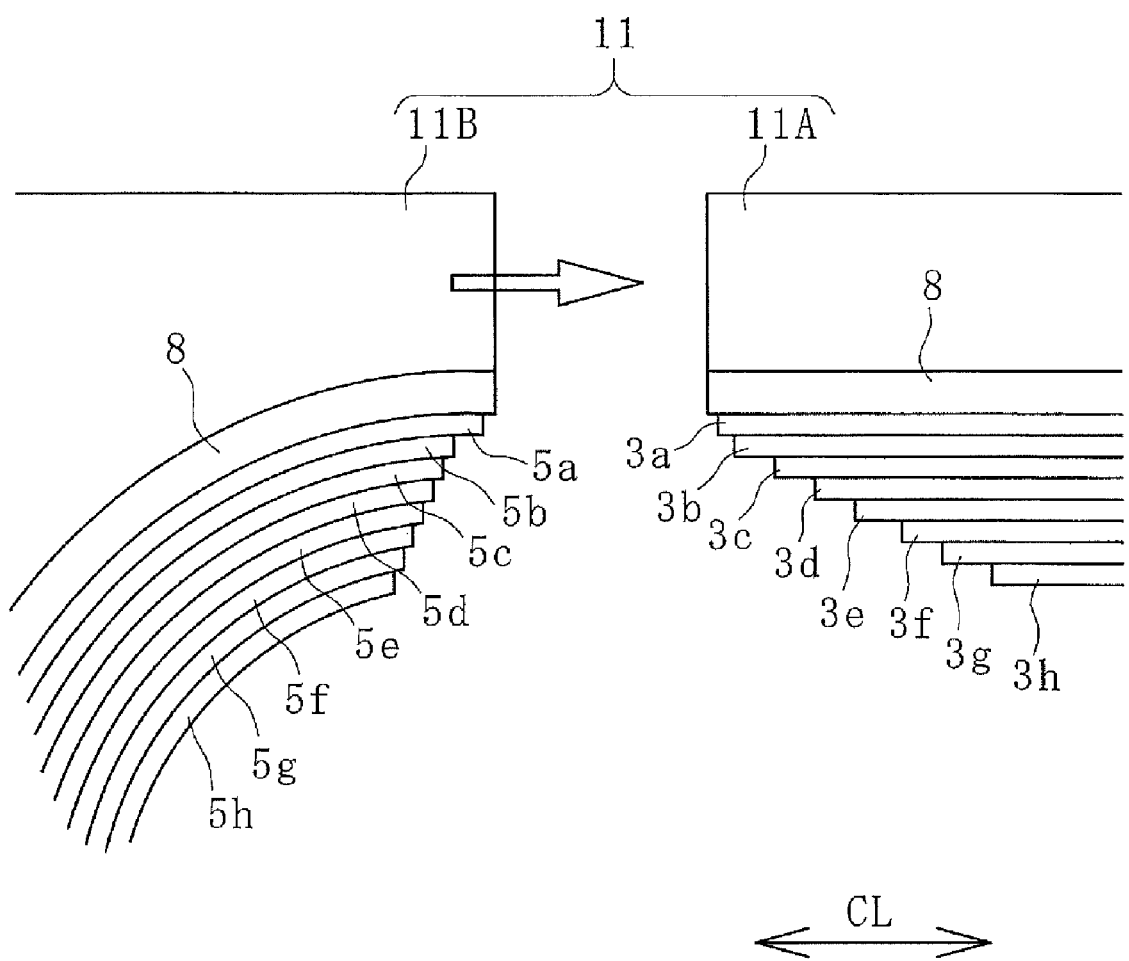
FIG. 7 is an explanatory diagram illustrating a step of molding the body of FIG. 1 in a vertical cross-sectional view.

In order to mold a body 1A in an unvulcanized state, as illustrated in FIG. 7, a molding mold 11A for the body portion having a cylindrical shape and a molding mold 11B for the hemispherical portion having a bowl shape connected to both ends of the molding mold 11A for the body portion are used. The molding mold 11A for the body portion and the molding molds 11B for the hemispherical portion are separated, and the reinforcing layers 3 (3a to 3h) constituting the body portion 2 are layered on the inner side of the molding mold 11A for the body portion to form a multilayer structure. The reinforcing layers 5 (5a to 5h) constituting the hemispherical portion 4 are layered on the inner side of each of the molding molds 11B for the hemispherical portion to form a multilayer structure. Note that an unvulcanized rubber that forms the outer layer rubber 8 is disposed between the reinforcing layer 3a and the inner circumferential surface of the molding mold 11A for the body portion and between the reinforcing layer 5a and the inner circumferential surface of the molding mold 11B for the hemispherical portion.

Figure 8:
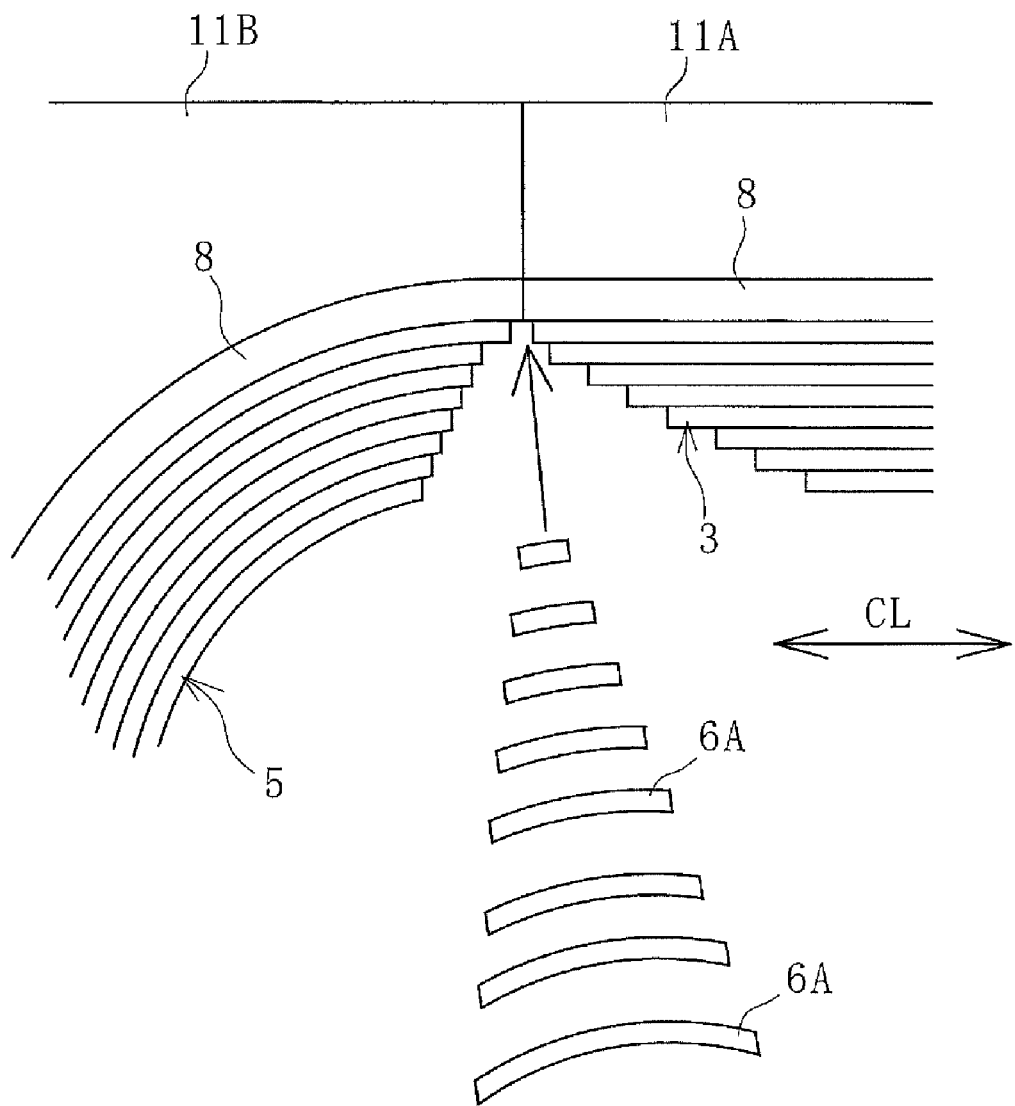
FIG. 8 is an explanatory diagram illustrating a step of disposing a member in the space between the reinforcing layer constituting the body portion of FIG. 7 and the reinforcing layer constituting the hemispherical portion in a vertical cross-sectional view.

Subsequently, as illustrated in FIG. 8, each of the molding molds 11B for the hemispherical portion is connected to both ends of the molding mold 1A for the body portion. It is not necessary to connect each of the molding molds 11B for the hemispherical portion to the molding mold 1A for the body portion at the same time, but they may be sequentially connected together. Then, both end portions in the cylinder axial direction of the multilayer structure of the respective reinforcing layers 3 (3a to 3h) constituting the body portion 2 and the multilayer structure of the respective corresponding reinforcing layers 5 (5a to 5h) of the hemispherical portions 4 are disposed facing each other with the space S, and the bonding members 6A are sequentially disposed in the respective spaces S starting with the bonding member 6A positioned closer to the outer circumferential side of the body 1A. Accordingly, a reinforcing body formed of the reinforcing layers 3 and 5 is molded. An unvulcanized rubber that forms the inner layer rubber 7 is layered on the inner surface of the reinforcing body. The mouthpiece portion 10 is attached to a position serving as a predetermined position of the hemispherical portion 4 when the reinforcing layer 5 is layered. Then, a bladder in which unvulcanized rubber serving as the outer layer rubber 8 and the inner layer rubber 7 is layered on the outer surface and the inner surface of the reinforcing body formed of the reinforcing layers 3 and 5 is placed inside a vulcanizing oven and is vulcanized under predetermined conditions to manufacture the body 1A. Note that since the body 1A is sufficiently large, a worker can enter and work inside the body 1A. The worker can enter and exit the body 1A through the mouthpiece portion 10.

According to the method of manufacturing the body 1A in this manner, a plurality of sizes of the fenders 1 can be manufactured by appropriately setting the cord angles A and B of the reinforcing layer 3 and the bonding member 6A respectively, using only one type of molding mold 11. That is, since it is not necessary to prepare a dedicated molding mold 11 for each size of the fender 1, there is a great merit in reducing the cost required for the manufacturing equipment.

When the manufactured fender 1 is not used for storage, transportation, or the like, the internal pressure of the body 1A is set to a low pressure of approximately 10 kPa, for example, so as to be in a neutral state in which the body 1A is not expanded as illustrated in FIG. 1. Furthermore, the air inside the body 1A is discharged to bring it into a folded state.

Figure 9:
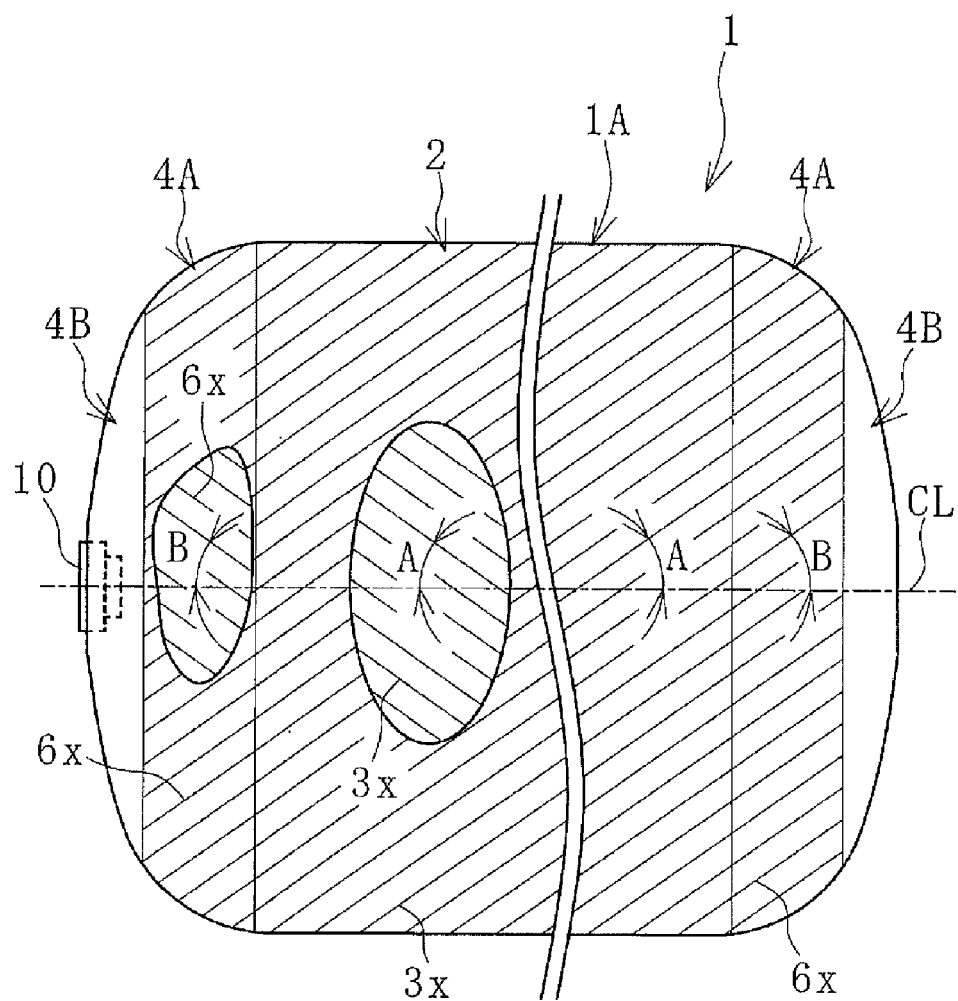
FIG. 9 is an explanatory diagram illustrating the pneumatic fender of FIG. 1 in which the body is loaded with a specified internal pressure and is expanded in a predetermined shape, with a portion of a member of the body being cut away in a side view.

When the fender 1 is attached to an installation location and is used, the body 1A is expanded and maintained in a predetermined shape as illustrated in FIG. 9. Specifically, the inside of the body 1A is filled with air through a valve placed in the mouthpiece portion 10 and is loaded with a specified internal pressure P. The specified internal pressure P is, for example, approximately in a range of 50 kPa or more and 100 kPa or less.

In the process of filling the inside of the body 1A with air to reach the specified internal pressure P, the cord angle A of each of the reinforcing layers 3 of the body portion 2 will increase to approximately a stable angle of repose (from 54° to 55°). In the process of loading the body 1A with the specified internal pressure P even in the predetermined range 4A, the cord angle B of each of the bonding members 6A will increase to approximately a stable angle of repose (from 54° to 55°).

That is, not only the reinforcing layers 3 constituting the body portion 2, but also each of the bonding members 6A disposed in each space S between the reinforcing layers 3 and the reinforcing layers 5 constituting the hemispherical portion 4 and disposed facing the reinforcing layers 3 has a bias structure. Furthermore, the cord angles A and B of the reinforcing layer 3 and the bonding member 6A that are bonded together are set to approximately the angle identical to each other. Thus, when the body 1A is filled with air and loaded with the specified internal pressure P, since the cord angle B of each of the bonding members 6A will increase to approximately a stable angle of repose, the body portion 2 and the boundary region (the predetermined range 4A) between the body portion 2 and the hemispherical portion 4 will also easily expand. Since the multilayer structure of the reinforcing layers 5 is not a bias structure, even when the body 1A is loaded with the specified internal pressure P, the shape of the end portion range 4B of the hemispherical portion 4 will not be significantly deformed from the shape in the neutral state unlike the body portion 2 and the predetermined range 4A.

Furthermore, since the respective spaces S have a plurality of different types of sizes, one set of ends E1 of the spaces S are set to a plurality of different positions, and the other set of ends E2 of the spaces S are also set to a plurality of different positions, with respect to the circumferential direction of the hemispherical portion 4 having an arcuate shape in a side view of the body 1A. Thus, since the bonding positions (overlapping positions) between the bonding members 6A and the respective reinforcing layers 3 and 5 are dispersed with respect to the circumferential direction, the difference in rigidity of the body 1A in the circumferential direction is suppressed. As a result, when the body 1A is loaded with the specified internal pressure P, the strain occurring at or near the boundary between the body portion 2 and the hemispherical portion 4 is rectified, and it becomes easy to obtain the body 1A that has been expanded to a predetermined shape.

For example, when the body 1A is loaded with the specified internal pressure P and the outer diameter D of the body portion 2 is approximately 130% (1.3D) of that in the neutral state, it becomes easy to ensure an ideal predetermined shape in which the ratio between the outer diameter of the body portion 2 and the dimension of the body 1A in the longitudinal direction (the cylinder axial direction) is 1:2.

If the cord angles A and B in the neutral state are less than 25°, when the cord angle A is increased to approximately the angle of repose, excessive shear stress is generated in the intermediate rubber layer 9, which is not preferable. If the cord angles A and B are more than 45°, the degree of diameter expansion of the body portion 2 and the predetermined range 4A of the hemispherical portion 4 when the body 1A being loaded with the specified internal pressure P from the neutral state and expanded is reduced. The cord angles A and B are more preferably set to 30° or more and 35° or less.

One end Tma on the end portion range 4B side of each of the bonding members 6A illustrated in FIG. 5 is set to an appropriate range. In other words, as illustrated in FIG. 1, one end Tma is preferably set to be within the range indicated by the angle b in the neutral state of the body 1A. Specifically, the range of the angle b is a range extending from a boundary line between the body portion 2 and the hemispherical portion 4 to the end portion range 4B side by the angle b about a point P separated from the surface of the body portion 2 by 0.2 or more and 0.4 or less (0.2D or more and 0.4D or less) of the outer diameter D of the body 1A on the boundary line. The angle b is 0° or more and 46° or less.

In order to ensure the predetermined shape when the body 1A is loaded with the specified internal pressure P, the effect of the degree of expansion and deformation of the body 1A within the range of this angle b is great. Accordingly, when one set of respective ends Tma is set to be within the range of this angle b, it becomes easier to ensure the body 1A that has been expanded to the predetermined shape when the body 1A is loaded with the specified internal pressure P.

In the previous embodiment, each of the bonding members 6A is disposed in each space S as a single-layer sheet material, but the specification may be varied. For example, in a case where the number of reinforcing layers 3 constituting the body portion 2 and the number of reinforcing layers 5 constituting each of the hemispherical portions 4 are six or more, the specifications illustrated in FIG. 10 are preferably employed.

Figure 10:
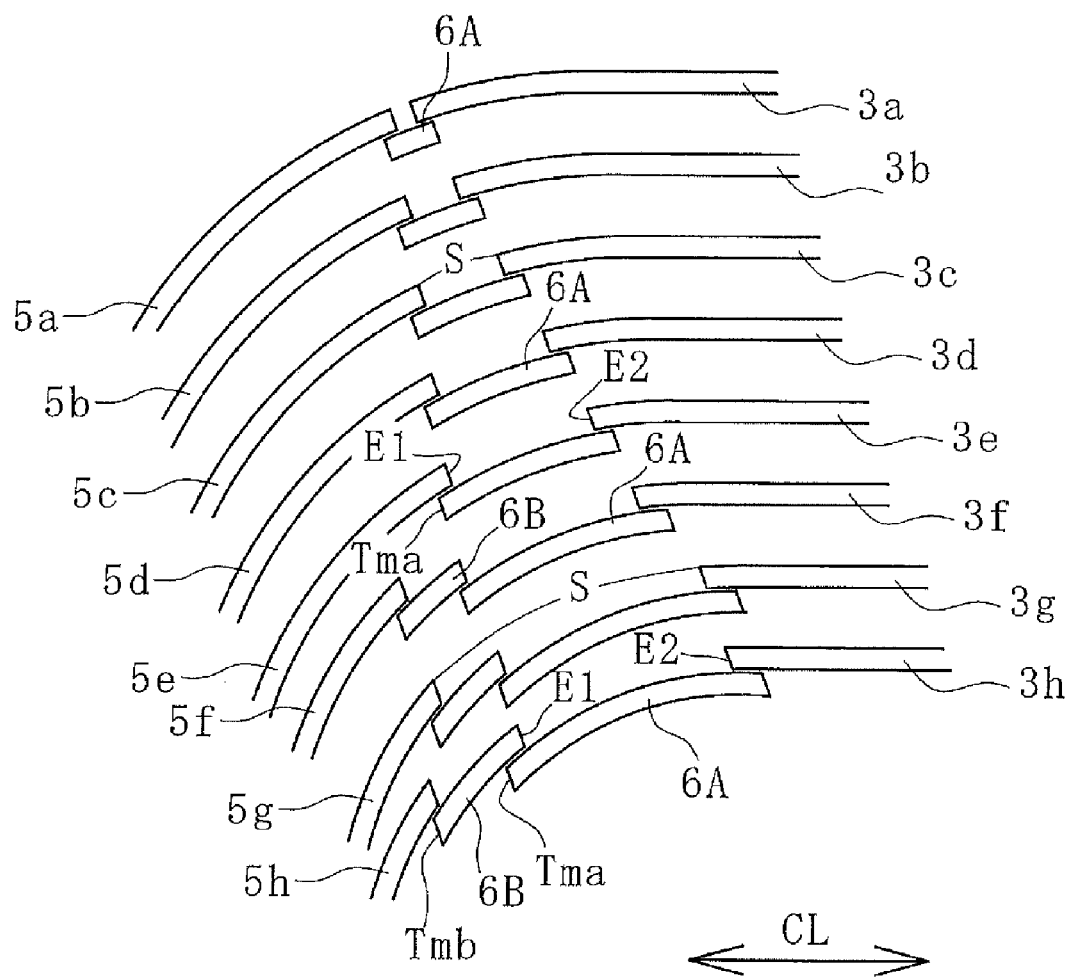
FIG. 10 is an explanatory diagram of a modified example of the connection structure of FIG. 5.

In FIG. 10, in the sixth or more reinforcing layers 3f, 3g, and 3h (5f, 5g, 5h) from the outer circumferential side to the inner circumferential side of the body 1A, the bonding member 6A described above and another bonding member 6B bonded to the hemispherical portion-side end portion of the bonding member 6A are disposed in the space S corresponding to this reinforcing layer. The facing members (the reinforcing layers 3f and 5f, the reinforcing layers 3g and 5g, and the reinforcing layers 3h and 5h) that sandwich the space S are bonded to each other with the bonding member 6A and the other bonding member 6B interposed between the facing members, the bonding member 6A and the other bonding member 6B disposed in the spaces S. The bonding length (overlap length) of the bonding members 6A and 6B, and the bonding length (overlap length) between the respective reinforcing layer 5 and the bonding member 6B are set to the minimum necessary to prevent the rigidity from being locally increased.

Similarly to the bonding member 6A, the other bonding member 6B is formed of multiple cords aligned to extend in parallel at a predetermined cord angle with respect to the cylinder axial direction CL. However, the cord angle of the other bonding member 6B is set to be smaller than the cord angle B of the bonding member 6A being bonded. Thus, the bonding member 6B may be formed using the material identical to the material of the bonding member 6A and may be disposed at a cord angle different from that of the bonding member 6A. Note that one end Tmb of each of the other bonding members 6B is positioned closer to the end portion range 4B than the range of the angle b illustrated in FIG. 1.

When the number of layers of the reinforcing layers 3 and 5 is large in this manner, the reinforcing layers 3 and 5 disposed on the inner circumferential side are bonded using the bonding members 6A and 6B. Accordingly, when the body 1A is loaded with the specified internal pressure P, the boundary region between the body portion 2 and the hemispherical portion 4 are expanded smoothly together with the expanding body portion 2, and it becomes further easier to ensure the body 1A with a predetermined shape.

REFERENCE SIGNS LIST

1 Pneumatic fender
1A Body
2 Body portion
3 (3a to 3h) Reinforcing layer
3x Cord
4 Hemispherical portion
4A Predetermined range
4B End portion range
5 (5a to 5h) Reinforcing layer
5x Cord
6A, 6B Bonding member
6x Cord
7 Inner layer rubber
8 Outer layer rubber
9 Intermediate rubber layer
10 Mouthpiece portion
11 (11A, 11B) Molding mold
S Space

The invention claimed is:

1. A pneumatic fender which comprises a body comprising a body portion having a cylindrical shape, and a hemispherical portion having a bowl shape connected to both ends of the body portion, in which the body is constituted by a plurality of reinforcing layers layered between an inner layer rubber and an outer layer rubber, each of the reinforcing layers in the body portion is formed of multiple cords aligned to extend in parallel at a predetermined cord angle with respect to a cylinder axial direction, the cords of the reinforcing layers layered adjacently have an intersecting bias structure, and the cord angle in a neutral state where the body is not expanded is set to 25° or more and 45° or less,
    both end portions in the cylinder axial direction of each of the reinforcing layers of the body portion and each of the corresponding reinforcing layers of the hemispherical portion facing each other with a space,
    members facing each other being bonded with a bonding member interposed between the members facing each other, the bonding member disposed in each of the spaces,
    each of the bonding members being formed of multiple cords aligned to extend in parallel,
    the multiple cords of the bonding members extending in an orientation identical to an orientation of the cords of a corresponding bonding target reinforcing layer of the body portion,
    a cord angle of the cords of the bonding members being set to ±10° of the cord angle of the cords of the bonding target reinforcing layer in a neutral state where the body is not expanded, and
    the spaces having a plurality of different sizes, one set of ends of the spaces being set to a plurality of different positions, and an other set of ends of the spaces being set to a plurality of different positions, with respect to a circumferential direction of the hemispherical portion having an arcuate shape in a side view of the body.

2. The pneumatic fender according to claim 1, wherein the size of each of the spaces increases as it approaches an inner circumferential side of the body.

3. The pneumatic fender according to claim 1, wherein each of the bonding members is disposed in each of the spaces as a single-layer sheet member.

4. The pneumatic fender according to claim 1, wherein
- the number of reinforcing layers constituting the body portion and each of the hemispherical portions is six or more,
- in the sixth or more reinforcing layers from an outer circumferential side of the body to an inner circumferential side, the bonding member and another bonding member bonded to the hemispherical portion-side end portion of the bonding member are disposed in the space corresponding to the reinforcing layer,
- the members facing each other with the space therebetween are bonded with the bonding member and the other bonding member interposed between the members facing each other, the bonding member and the other bonding member disposed in the space, and
- a cord angle of the other bonding member is set to be smaller than the cord angle of the bonding member being bonded.

5. A method of manufacturing the pneumatic fender according to claim 1, the method comprising:
- using a molding mold for the body portion having a cylindrical shape and a molding mold for the hemispherical portion having a bowl shape connected to both ends of the molding mold for the body portion to create a state in which the molding mold for the body portion and the molding molds for the hemispherical portion are separated;
- layering the reinforcing layers constituting the body portion on an inner side of the molding mold for the body portion;
- layering the reinforcing layers constituting the hemispherical portion on an inner side of each of the molding molds for the hemispherical portion;
- connecting the molding molds for the hemispherical portion to both ends of the molding mold for the body portion so that both end portions in the cylinder axial direction of each of the reinforcing layers constituting the body portion and each of the corresponding reinforcing layers of the hemispherical portion face each other with a space;
- sequentially disposing the bonding members in the respective spaces to form a reinforcing body formed of the reinforcing layers; and
- vulcanizing a bladder in which unvulcanized rubbers that form the outer layer rubber and the inner layer rubber are layered on an outer surface and an inner surface of the reinforcing body under predetermined conditions to obtain the body.

\* \* \* \* \*